Figure 1:
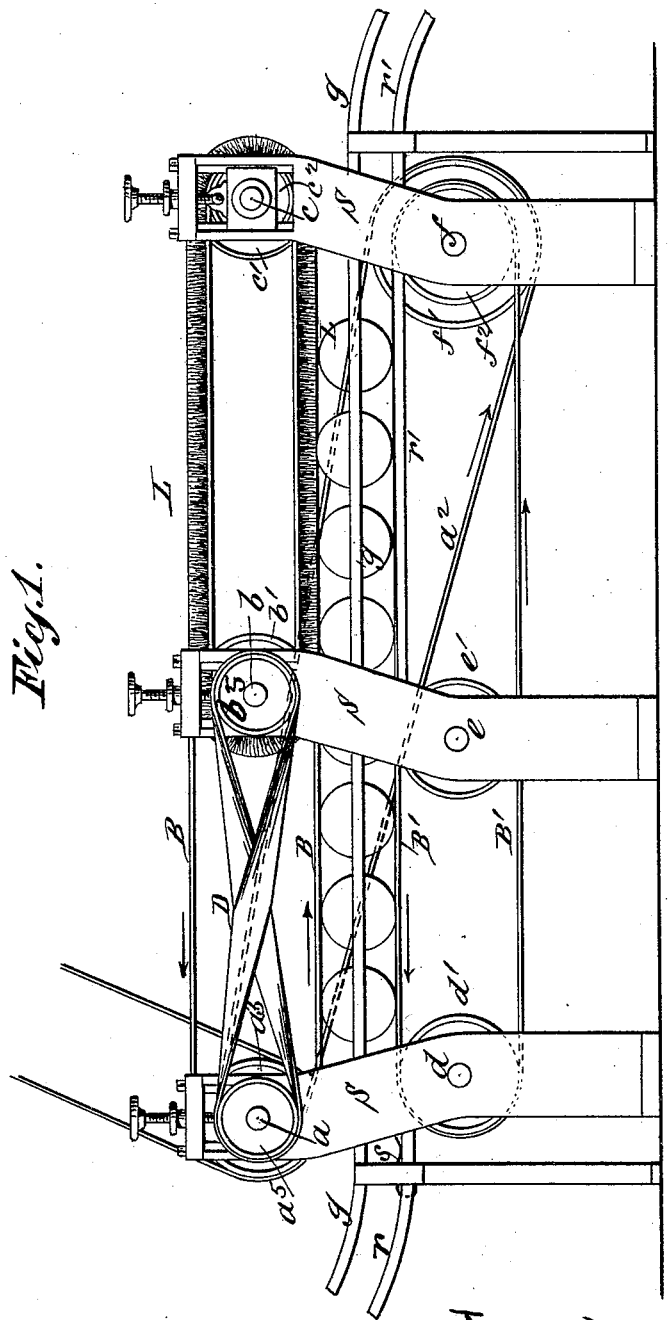

(No Model.)  3 Sheets—Sheet 1.

O. S. FELLOWS.
MEANS FOR REMOVING SUPERFLUOUS SOLDER FROM SHEET METAL CANS.

No. 586,966.  Patented July 27, 1897.

Witnesses.
D. W. Gardner
Louis N. Rowley.

Inventor:
Olin S. Fellows
By his Attorney
George William Miatt (No Model.) 3 Sheets—Sheet 2.

O. S. FELLOWS.
MEANS FOR REMOVING SUPERFLUOUS SOLDER FROM SHEET METAL CANS.

No. 586,966. Patented July 27, 1897.

Witnesses:
D. W. Gardner.
Louis N. Rowley.

Inventor:
Olin S. Fellows
By his Attorney
George William Miatt (No Model.) 3 Sheets—Sheet 3.
O. S. FELLOWS.
MEANS FOR REMOVING SUPERFLUOUS SOLDER FROM SHEET METAL CANS.
No. 586,966. Patented July 27, 1897.
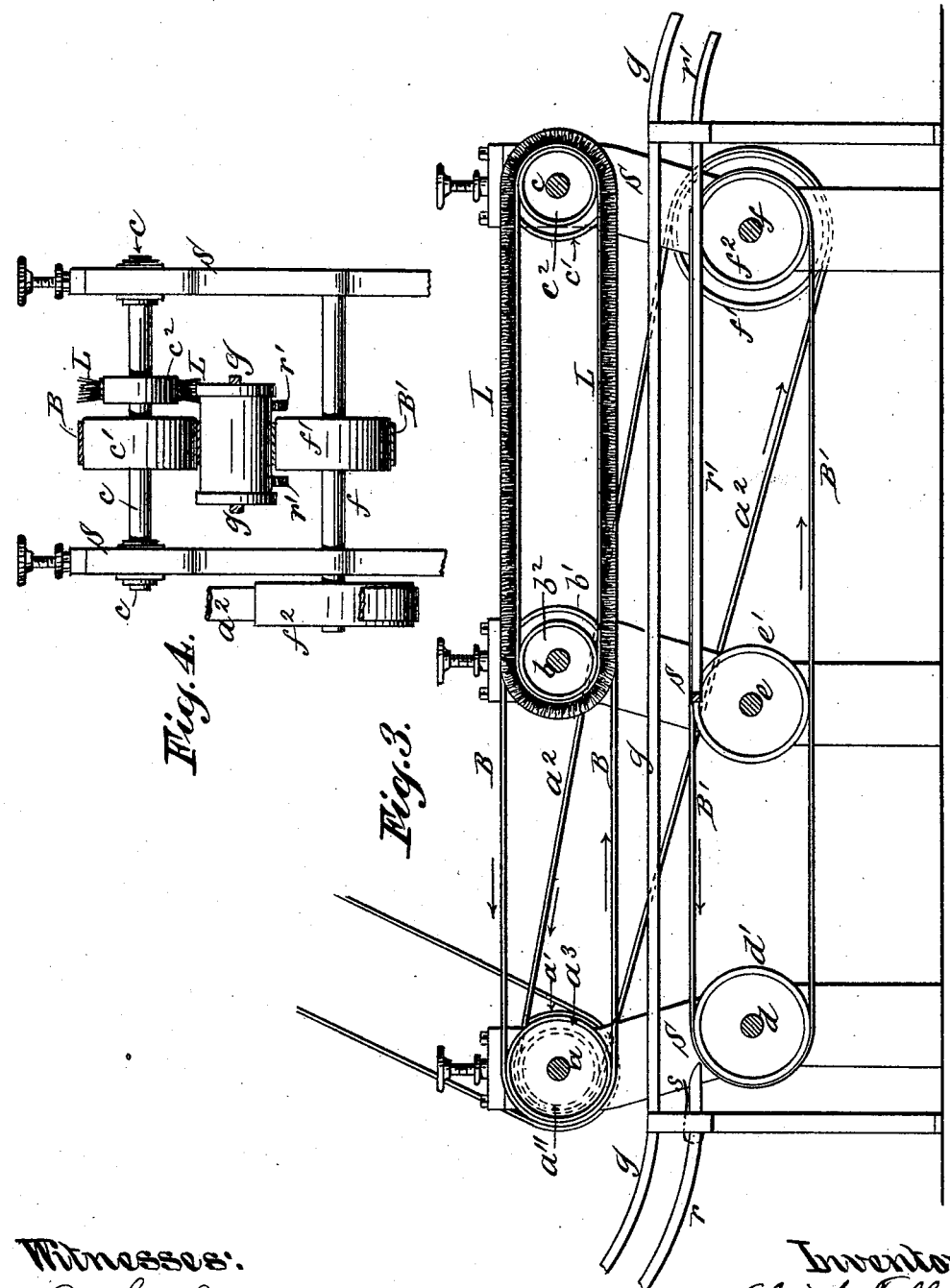

UNITED STATES PATENT OFFICE.

OLIN S. FELLOWS, OF MIDDLETOWN, NEW YORK.

MEANS FOR REMOVING SUPERFLUOUS SOLDER FROM SHEET-METAL CANS.

SPECIFICATION forming part of Letters Patent No. 586,966, dated July 27, 1897.

Application filed September 19, 1896. Serial No. 606,326. (No model.)

*To all whom it may concern:*

Be it known that I, OLIN S. FELLOWS, a citizen of the United States, residing at Middletown, in the county of Orange and State of New York, have invented certain new and useful Improvements in Means for Removing the Superfluous Solder from Sheet-Metal Cans, of which the following is a specification sufficient to enable others skilled in the art to which the invention appertains to make and use the same.

My invention relates to the manufacture of sheet-metal cans in which the end plates are soldered to the cylindrical bodies by passing the edges of the can over and in contact with molten solder. As set forth in my concurrent applications, Serial No. 605,598, filed September 12, 1896, and Serial No. 605,967, filed September 16, 1896, this method of soldering the end plates to the can-bodies, while simple and effective in so far as the sealing of the joints is concerned, is wasteful of solder, the exterior surfaces of the can taking up and carrying away an excess of solder over and above that requisite to unite the parts. In my concurrent application, Serial No. 605,598, heretofore referred to, I overcome this defect largely by the utilization of centrifugal force for the purpose of throwing off the superfluous solder. In my application Serial No. 605,967, also hereinbefore referred to, I accomplish a similar result by means of an endless brush-belt acting in conjunction with mechanism for passing the soldered cans continuously and severally in contact with an endless brush-belt. Both of the above-mentioned methods give good practical results, but I have found by experiment and investigation that the most perfect and satisfactory results are attained by combining the two methods, for the following reasons: As the edges of the cans pass through the soldering-bath, and owing to the depth to which the edges of the cans are necessarily submerged therein in order to bring the edges of the end-plate flanges below the surface of the solder-bath, the end plates take up and carry away an amount of solder that is entirely useless and which is not reached nor removed by the brush-belt that so effectually cleans and polishes the flanges and lower parts of the can-bodies, while, on the other hand, the centrifugal force, while it impels the solder taken up by the end plates to the edges thereof and throws most of it off, is still apt to leave residual ridges on the edges of the cans and does not remove the solder from the cap-flange and can-body as perfectly as does the brush-belt, for the reason that the surfaces of the flange and can-body are at right angles to the plane in which the centrifugal force acts, whereas the end plates coincide substantially with said plane of centrifugal force. Hence the centrifugal force may be safely relied upon to drive off the greater portion of the excess of solder from the end plates and to carry the remainder to or over the edges of the cans, from whence it may be removed positively by the brush-belt.

It will thus be seen that by the use of centrifugal force alone, while I obtain clean end plates, I am not able to clean the flanges and adjoining portions of the can-bodies as effectually as I desire, whereas by the use of the brush-belt alone the end plates retain most of the superfluous solder taken up by them. I have therefore devised apparatus in which the superfluous solder is removed by the combined action of centrifugal force and of an endless brush-belt, the centrifugal action throwing off most of the superfluous solder, especially from the end plates, and collecting the remainder in the most advantageous position for removal by the brush, substantially as hereinafter set forth. The brush also performs another important function, in that it insures a perfect joint between the opposed surfaces of the end plate and can-body by forcing the solder in between said opposed surfaces, thereby compensating for any lack or inequality in the flow of solder.

Figure 2:
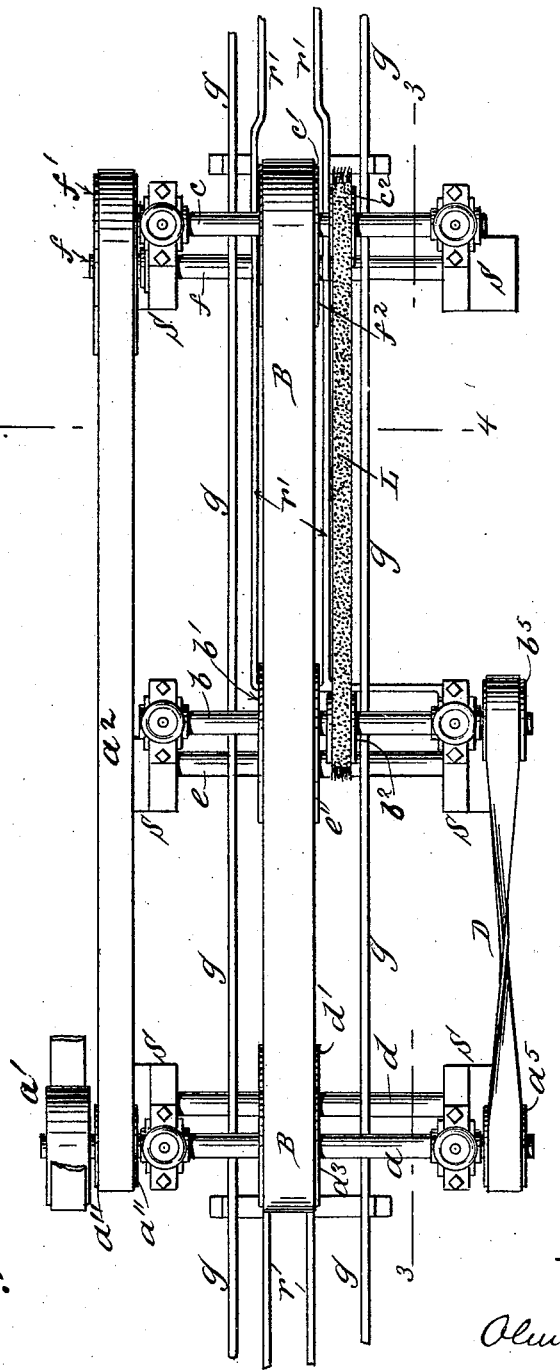

In the accompanying drawings, Figure 1 is an elevation of my improved solder-saving apparatus; Fig. 2, a plan of the same. Fig. 3 is a sectional elevation upon plane of line 3 3, Fig. 2. Fig. 4 is a transverse section upon plane of line 4 4, Fig. 2.

The standards S support the several shafts $a\ b\ c\ d\ e\ f$. The power-pulley $a'$ is secured to the shaft $a$, upon which is also mounted the transmitting-pulley $a''$, by which power is transmitted by means of the belt $a^2$ to the pulley $f'$ on the shaft $f$, said pulley $f'$ being of greater diameter than the pulley $a''$. The pulleys $a^3$ $b'$ $c'$ support an endless belt B, while the pulleys $d'$, $e'$, and $f^2$ support a similar belt B', the opposed surfaces of said belts receiving and acting upon the cans from the rails $r$ $r$, extending from the soldering-machine. It will be seen that the adjoining and opposed surfaces of the belts B B' travel in opposite directions, as indicated by the arrows, and at different speeds, the upper belt B traveling faster than the lower belt B', so that cans fed in between the belts by the rails $r$ $r$ will be rotated upon their longitudinal axes and finally discharged onto the rails $r'$ $r'$ at the opposite end of the apparatus.

$g$ $g$ are guard-rails which preserve the alinement of the cans throughout their journey.

$s$ is a spring which tends to press the cans up against the under side of the belt B and to thereby secure their entrance between both belts. The upper shafts $a$ $b$ $c$ are adjustable vertically for the purpose of regulating accurately the relative positions of the belts to conform to the requirements of the cans under treatment. The pulleys $b'$ $e'$ are idlers.

Upon the shafts $b$ $c$ are mounted small pulleys $b^2$ $c^2$, supporting the endless brush-belt L, the pulley $c^2$ being an idler. The pulleys $a^5$ $b^5$ on the shafts $a$ $b$ are connected by a cross-belt D, by which power is transmitted from the shaft $a$ to the shaft $b$, causing it and the pulley $b^2$ to rotate in the opposite direction to that of the shaft $a$, and thereby imparting motion to the brush-belt L in a direction opposite to that of the belt B.

It will be seen by reference to Fig. 4 that the belts B B' bear upon the cylindrical bodies of the cans, while the brush-belt L is so situated that it bears against the ends or edges of the cans which have passed through the soldering-bath and beyond the pulley $b^2$.

The rails $r'$ $r'$ extend under the brush L, parallel to the upper side of the endless belt B', but slightly below the upper surface of the latter, the object being to sustain the cans against the action of the brush-belt.

In operation the cans from the soldering-machine are grasped by and between the belts B B', by which they are rotated upon their longitudinal axes with sufficient velocity to throw off by centrifugal force the main portion of the superfluous solder adhering to the exterior edges of the can, while at the same time they are gradually passed toward the endless brush-belt L. The distance and speed are so timed as to effect the displacement of the superfluous solder from the end plates or for its collection upon the edges of the flanges before the endless brush-belt is encountered, so that the latter, traveling, as it does, in a direction opposite to that in which the cans rotate, will sweep off all remaining superfluous solder and impart a finished and polished appearance to the edges of the cans. The cans are finally discharged onto the rails $r'$ $r'$, which convey them to the next soldering-machine or to any other desired place.

The arrangement shown in the drawings is preferable in that it affords the greater economy of space in proportion to the length of treatment of the cans. Similar results may be attained in connection with the brush-belt L by the use of belts B B', traveling in the same direction but at different speeds, provided the run is made of sufficient length to insure the requisite number of revolutions, or a single belt may be used in conjunction with a stationary way or support. The brush, instead of being an endless belt, may consist of a stationary brush of suitable length, against which the cans may be rotated, as described, but the traveling endless brush is preferable, as it affords a greater amount of contact within a given space.

It is to be understood that in using the word "brush" herein I do not confine myself to any special form thereof, since any equivalent arrangement of elastic and resilient bristles, wires, or scrapers may be substituted for the removal of the surplus solder with like result.

What I claim as my invention, and desire to secure by Letters Patent, is—

1. In a solder-saving device, the combination with an endless traveling belt and an opposed can-support arranged to receive the cans between them and to impart to the said cans a speed of rotation sufficient to throw off by centrifugal force the main portion of the excess of melted solder adhering thereto while forwarding them and rotating them axially in the direction of their line of progress, of a brush arranged to act upon the soldered edges of the cans, thereby insuring perfect joints by brushing the solder in between the opposed surfaces of the can-bodies and end plates while removing the superfluous solder and polishing the exteriors of the joints, substantially in the manner described.

2. In a solder-saving device, the combination with an endless traveling belt and an opposed can-support arranged to receive the cans between them and to impart to the said cans a speed of rotation sufficient to throw off by centrifugal force the main portion of the excess of solder adhering thereto while forwarding and rotating them axially in the direction of their line of progress, of an endless brush-belt arranged to act upon the soldered edges of the cans in a direction opposed to their line of progress and the direction of their axial rotation, thereby insuring perfect joints by brushing the solder in between the opposed surfaces of the can-bodies and end caps, while removing superfluous solder and polishing the exteriors of the joints, substantially as herein set forth.

3. In a solder-saving device the combination of an endless belt traveling in one direction at a comparatively high rate of speed and an opposed endless belt traveling in the opposite direction at a lower rate of speed, said belts being arranged to receive the cans between them and to impart to the said cans a speed of rotation sufficient to throw off by centrifugal force the main portion of the excess of solder adhering thereto while forwarding and rotating them axially in the direction of their line of progress, of an endless brush-belt arranged to act upon the soldered edges of the cans in a direction opposed to their line of progress and to the direction of their axial rotation, thereby insuring perfect joints by brushing the solder in between the opposed surfaces of the can-bodies and end caps while removing the superfluous solder and polishing the exteriors of the joints, substantially as described.

OLIN S. FELLOWS.

Witnesses:
GEORGE WILLIAM MIATT,
D. W. GARDNER.